US008639631B2

(12) United States Patent
Beaver et al.

(10) Patent No.: US 8,639,631 B2
(45) Date of Patent: Jan. 28, 2014

(54) ENABLEMENT OF SOCIAL NETWORKING BASED ON ASSET OWNERSHIP

(75) Inventors: Michael B. Beaver, Raleigh, NC (US); Jonathan A. Lewis, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 11/958,887

(22) Filed: Dec. 18, 2007

(65) Prior Publication Data

US 2009/0157677 A1 Jun. 18, 2009

(51) Int. Cl.
*G06Q 99/00* (2006.01)
*G06Q 10/00* (2012.01)

(52) U.S. Cl.
USPC .......................................... 705/319; 705/304

(58) Field of Classification Search
USPC ......................................................... 705/305
See application file for complete search history.

(56) References Cited

U.S. PATENT DOCUMENTS

| | | | | |
|---|---|---|---|---|
| 5,563,805 | A * | 10/1996 | Arbuckle et al. | 709/204 |
| 6,049,776 | A * | 4/2000 | Donnelly et al. | 705/8 |
| 6,507,821 | B1 * | 1/2003 | Stephanou | 705/7.14 |
| 2002/0091669 | A1 * | 7/2002 | Puram et al. | 707/1 |
| 2002/0167539 | A1 * | 11/2002 | Brown et al. | 345/705 |
| 2004/0158629 | A1 * | 8/2004 | Herbeck et al. | 709/224 |
| 2005/0010467 | A1 * | 1/2005 | Dietz et al. | 705/9 |
| 2006/0229902 | A1 * | 10/2006 | McGovern et al. | 705/1 |

OTHER PUBLICATIONS

Adriana Vivacqua and Henry Lieberman, Agents to Assist in Finding Help, CHI Letters, vol. 2, Issue 1 (Apr. 2000), pp. 65-72.*
Audris Mockus , James D. Herbsleb, Expertise browser: a quantitative approach to identifying expertise, Proceedings of the 24th International Conference on Software Engineering, May 19-25, 2002, Orlando, Florida.*

* cited by examiner

*Primary Examiner* — Jonathan Ouellete
*Assistant Examiner* — Maame Ofori-Awuah
(74) *Attorney, Agent, or Firm* — Lee Law, PLLC; Christopher B. Lee

(57) ABSTRACT

A skill finder service receives directly from a user or through a social networking service a request for help with an asset. The skill finder service finds users skilled in the asset from asset data collected by an asset management service. The skill finder service searches the asset data for assets that match the asset in the request, and for each matching asset, determines the user who owns the matching asset. The skill finder service creates a list of skilled users and sends the list to the requesting user. The requesting user can contact one or more of the skilled users for help with the asset. The skill finder service uses existing data typically obtained by asset data management services to provide a valuable service to users. Further, by using the asset data to find skilled users, the skill finder service lessons or eliminates the need for user-entered expertise listing.

20 Claims, 3 Drawing Sheets

ENABLEMENT OF SOCIAL NETWORKING BASED ON ASSET OWNERSHIP

BACKGROUND OF THE INVENTION

Online social networking is becoming increasingly popular and is seeing rapid growth and importance. The promise of social networking tools is to make it easier to find and interact with someone than it would have been by traditional means. One important use is to enable the finding of people who have expertise in a particular topic or product.

However, it is often difficult to find people who are knowledgeable in specific topics or products. This is mainly because there is a lack of data on what people's expertise are in a user list. Current solutions to this problem require users of a system to fill out a profile to make the system aware of what skills, knowledge, or level of expertise they possess. This is typical of employee listings. The drawbacks of this solution are that it relies on the users to manually fill in their profiles and share what they have knowledge in and to keep this profile up to date. Plus, if users do fill in profiles, they may not consider adding a skill that they indeed possess, i.e., users are not aware of their own expertise or do not find it important enough to list.

BRIEF SUMMARY OF THE INVENTION

A skill finder service enables social networking based on asset ownership. In one aspect, the skill finder service receives directly from a user or through a social networking service a request for help with an asset. The skill finder service finds users skilled in the asset from asset data collected by an asset management service. The skill finder service creates a list of the skilled users, and sends the list of the skilled users to the requesting user.

In one aspect, the skill finder service searches the asset data for assets that match the asset in the request, and for each matching asset, determines the user who owns the matching asset.

In one aspect, if usage data exists in the asset data, the skill finder service calculates a probability of expertise for each user who owns the matching asset based on the usage data. The list of skilled users contains the probability of expertise for each user who owns the matching asset.

In one aspect, if location data exists in the asset data, the skill finder service calculates a nearness to the requesting user of each user who owns a matching asset based on the location data. The list of skilled users contains the nearness to the requesting user who owns the matching asset.

DETAILED DESCRIPTION OF THE INVENTION

The invention provides a method and system for enabling social networking based on asset ownership. The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The exemplary embodiment provides a skill finder service that finds someone skilled in a specific asset without relying on users manually providing their own expertise information. The skill finder service receives requests from users for help with an asset. The skill finder service obtains information on users who own the asset from asset data collected by an asset management service in a system and infers probable user expertise based on the information. A list of the skilled users is then returned to the requesting user. The skill finder service utilizes existing data of an organization's assets and associated owners to help link a user to possible expert users.

Figure 1:
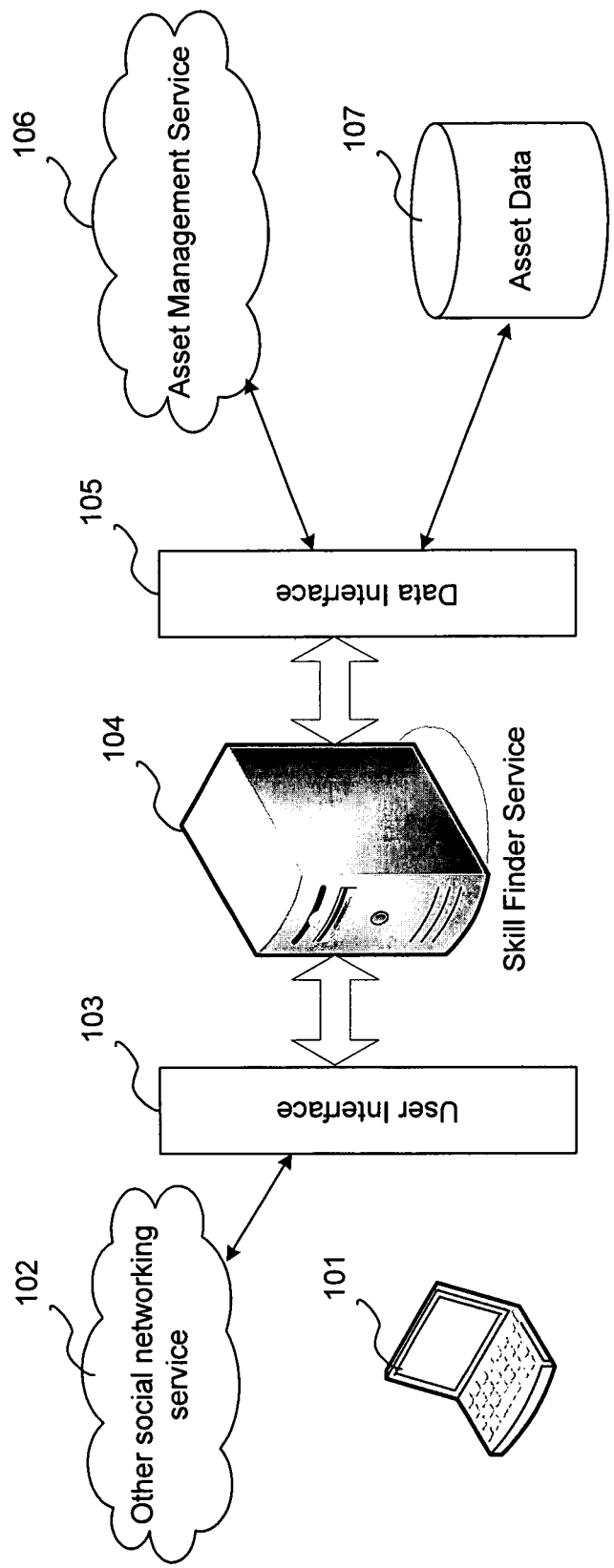
FIG. 1 illustrates an exemplary system with the skill finder service of the invention.

FIG. 1 illustrates an exemplary system with the skill finder service of the invention. The system includes a skill finder service 104 which communicates with a user 101 directly or through a social networking service 102 via a user interface 103. The skill finder service 104 further communicates with an asset management service 106 to obtain asset data 107 collected by the asset service 106, or has direct access to asset data 107, via a data interface 105. In the exemplary embodiment, the asset management service 106 is pre-existing in the system and is used as a discovery tool and/or receives manual entry of assets for an organization. Assets include any item within an organization that the organization wishes to track, such as computer hardware, software, printers, monitors, office equipment, and the like. The asset data 107 includes entries for each asset in the system and the user who owns the asset. Asset management services are commercially available will not be described further.

Figure 2:
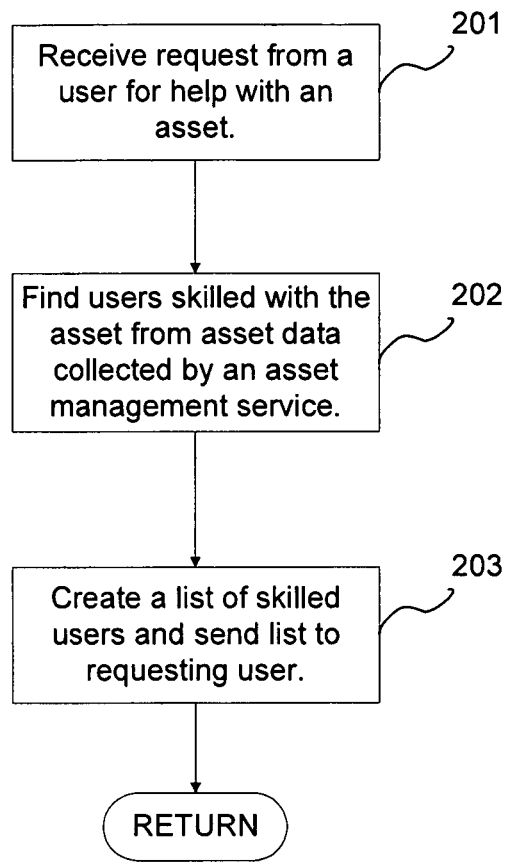
FIG. 2 illustrates an exemplary method for finding users skilled with an asset according to the invention.

FIG. 2 illustrates an exemplary method for finding users skilled with an asset according to the invention. Referring to both FIGS. 1 and 2, the skill finder service 104 receives a request from a user 101 for help with an asset (step 201). The skill finder service 104 finds users skilled with the asset from the asset data 107 collected by the asset management service 106 (step 202). The skill finder service 104 takes advantage of the existing data 107 of an organization's assets and associated owners already being collected by the asset management service 106. The basic data collected by the asset management service 106 includes an asset identifier and an asset owner or user. The skill finder service 104 searches the asset data 107 for matches to the asset in the request. The users who own the matching assets are then obtained. There is a good probability that if a user owns a specific asset, such as a piece of software or hardware, that the user will have some level of expertise with that asset. Based on this, a list of skilled users is created, and the list is sent to the requesting user (step 203). The requesting user can then contact one or more of the skilled users for help with the asset. Optionally, asset owners in the system can chose to opt out of the skill finder service 104 and not be contacted by other users for help with assets.

In the exemplary embodiment, the skill finder service 104 any contain any number or type of data interfaces 105 for communicating with the asset management service 106 or the asset data 107. Although FIG. 1 illustrates one asset management service 106 and one asset data source 107, the skill finder service 104 can communicate with multiple asset management services and/or multiple asset data sources through each of their corresponding data interface. The skill finder service 104 may further contain any number or type of user interfaces 103, including a direct user interface or an interface to allow another social networking tool or service to interface with the skill finder service 104 so that the skill finder service 104 can be a component of a large tool set. Because the skill finder service 104 contains the user interfaces 103 and the data interfaces 105, the requesting users 101 need not know how to access the asset management service 106 or asset data 107 directly. The list of skilled users can be provided by the skill finder service 104 with the asset management service 106 and asset data 107 hidden from the requesting users 101. By not having direct access by users 101, the integrity of the asset data 107 can be maintained and the asset management service 106 need not have the capability to service a plurality of requests for help from users 101.

Figure 3:
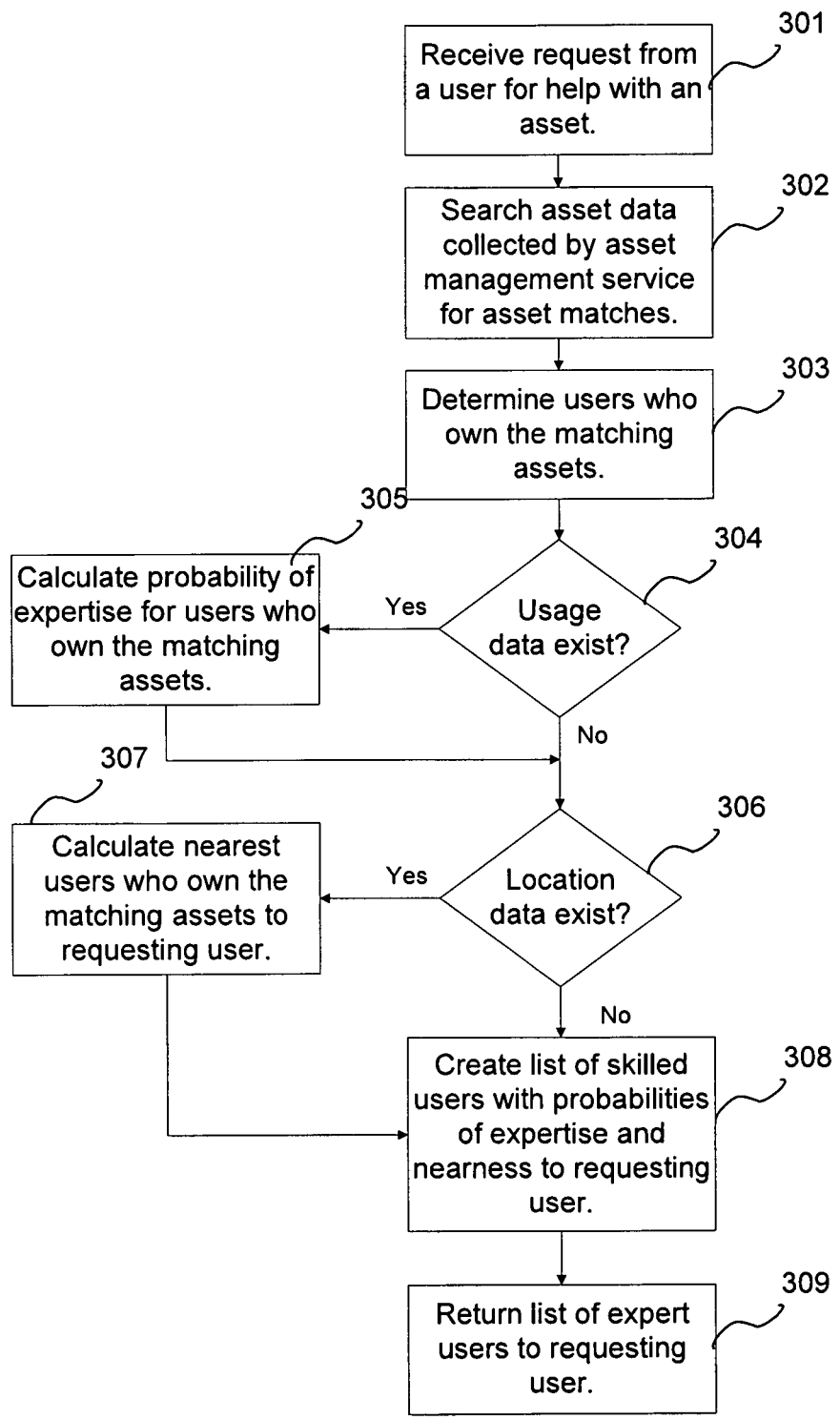
FIG. 3 illustrates in more detail the exemplary method for finding users skilled in an asset.

FIG. 3 illustrates in more detail the exemplary method for finding users skilled in an asset. The skill finder service 104 receives a request from a user 101 for help with an asset (step 301) via the user interface 103. The asset can be computer software, hardware, office equipment, or any other asset tracked by the asset management service 106. The skill finder service 104, via the data interface 105, searches the asset data 107 collected by the asset management service 106 for entries that match the asset in the request (step 302). For these entries, the skill finder service 104 determines the users who own the matching assets (step 303).

If additional information is available in the asset data 107, the list of the users with matching assets can be further processed prior to being provided to the requesting user. For example, asset data may include information such as usage data and location of the asset owner. Usage data includes information on how often the asset owner uses the asset. Location data includes the geographical location of the asset owner. If the matching assets' data includes usage data (step 304), then the skill asset service 104 calculates a probability of expertise for each user who owns a matching asset based on the usage data (step 305). The more a user uses the asset, the greater their probable expertise. If the matching assets' data includes location data (step 306), then the skill finder service 104 calculates the nearness of the users who own the matching assets to the requesting user (step 307). The skill finder service 104 creates a list of the skilled users along with their probability of expertise and their nearness to the requesting user (step 308), and the list is returned to the requesting user (step 309). The list can be sorted according to the probability of expertise or the nearness to the requesting user. Optionally, the list can be filtered to remove users who fail to meet an expertise threshold or who are beyond a certain distance from the requesting user.

Although the exemplary embodiment illustrates the use of usage data to calculate the probability of expertise, other asset data may be used in the calculation without departing from the spirit and scope of the invention. For example, users' job titles, years on the job, and authority within an organization may be considered as well.

In an example scenario, User A needs some help with Software Product X. User A sends a request to the skill finder service 104 for help with Product X (step 301). The skill finder service 104 searches the asset data 107 for Product X and finds three entries for Product X. From the entries, the skill finder service 104 determines that Users B, C, and D own Product X (step 303). The skill finder service 104 obtains usage data and location data from the entries. Using the usage data, the skill finder service 104 calculates the probability of expertise for Users B, C, and D (steps 304-305). Assume that User B has the highest usage of Product X and his probability of expertise is higher than Uses C and D. The skill finder service 104 further calculates the nearness of Users B, C, and D to User A (steps 306-307). Assume that User C is located in the same building but on a different floor than User A, but Users B and D are located in different buildings. The skill finder service 104 creates a list of skilled users that includes Users B, C, and D, along with their probabilities of expertise, their nearness to User A, and their contact information (step 308). This list is returned to User A (step 309). If User A decides to seek help from the user with the highest probability of expertise, then User A can contact User B. If User A decides to seek help from someone whom he can more easily speak with in person, then User A can contact User C instead of User B, since User C is nearer to User A.

A method and system for enabling social networking based on asset ownership have been disclosed. A skill finder service receives directly from a user or through a social networking service a request for help with an asset. The skill finder service finds users skilled in the asset from asset data collected by an asset management service. The skill finder service searches the asset data for assets that match the asset in the request, and for each matching asset, determines the user who owns the matching asset. The skill finder service creates a list of the skilled users and sends the list to the requesting user. The requesting user can then contact one or more of the skilled users for help with the asset. The skill finder service uses existing data typically obtained by asset data management services to provide a valuable service to users. Further, by using the asset data to find skilled users, the skill finder service lessons or eliminates the need for user-entered expertise listing.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport eh program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but no limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Although the invention has been described in accordance with the embodiments shown, one of ordinary skill in the art will readily recognize that there could be variations to the embodiments and those variations would be within the spirit and scope of the invention. Accordingly, many modifications may be made by one of ordinary skill in the art without departing from the spirit and scope of the appended claims.

What is claimed is:

1. A method for enabling social networking based on asset ownership, comprising:
   receiving, by a skill finder service computing device, a request from a user for help with use of a product owned by at least one product user comprising at least one of a hardware product and a software product;
   searching, by the skill finder service computing device using an asset management service that separately collects and manages product ownership data comprising ownership data for hardware products and software products, the product ownership data for owned products that match the product in the request, where the product ownership data further comprises, for each tracked product, a product identifier, a product owner identity, and a calculated probability of expertise of the identified product owner in using the product based upon how often the identified product owner uses the product;
   finding, by the skill finder service computing device, product owners that are skilled users of the product from the product ownership data comprising the product identifier for each tracked product and the product owner identity of each tracked product automatically collected by the asset management service;
   creating, by the skill finder service computing device, a list of all of the product owners that are skilled users of the product and the probability of expertise in using the product based upon how often the identified product owner uses the product; and
   sending, by the skill finder service computing device, the list of all of the product owners that are skilled users of the product and the probability of expertise in using the product based upon how often the identified product owner uses the product to the requesting user.

2. The method of claim 1, where the asset management service stores information on the products purchased by an organization.

3. The method of claim 1, wherein the finding comprises:
   for each matching product, determining, by the skill finder service computing device, a user that owns the matching product.

4. The method of claim 3, further comprising:
   determining, for each matching product, whether usage data exists in the product ownership data for the matching product, where the usage data comprises information identifying how often the product owner uses the product; and
   calculating, by the skill finder service computing device, in response to determining that the usage data exists in the product ownership data for the matching product, the probability of expertise in using the product for the user that owns the matching product based on how often the product owner uses the product as represented within the usage data for the matching product.

5. The method of claim 3, further comprising:
   determining, for each matching product, whether location data exists in the product ownership data for the owned products that match the product in the request; and
   calculating, by the skill finder service computing device, in response to determining that the location data exists in the product ownership data for the matching product, a nearness to the requesting user of the user that owns the matching product based on the location data for the matching product.

6. The method of claim 5, where the creating further comprises:
   creating the list of all of the product owners that are skilled users of the product and the probability of expertise in using the product based upon how often the identified product owner uses the product comprising users that own the matching product and the nearness to the requesting user of the user that owns the matching product.

7. The method of claim 1, where:
   receiving, by the skill finder service computing device, the request from the user for help with use of the product owned by at least one product user comprises:
   receiving the request from the user for help with use of the product owned by at least one product user at the skill finder service computing device via a social networking tool communication interface from a social networking tool.

8. A system, comprising:
   at least one user interface for communication with at least one user;
   at least one data interface for communication with at least one set of product ownership data of owned products automatically collected by an asset management service that separately collects and manages the product ownership data comprising ownership data for hardware products and software products, where the product ownership data further comprises, for each tracked product, a product identifier, a product owner identity, and a calculated probability of expertise of the identified product owner in using the product based upon how often the identified product owner uses the product; and
   a processor programmed to:
   receive a request from the user for help with use of a product owned by at least one product user comprising at least one of a hardware product and a software product;
   search the product ownership data for owned products that match the product in the request, where the product ownership data is automatically collected by the asset management service for owned products that match the product in the request;
   find product owners that are skilled users of the product from the product ownership data comprising the product identifier for each tracked product and the product owner identity of each tracked product automatically collected by the asset management service;
   create a list of all of the product owners that are skilled users of the product and the probability of expertise in using the product based upon how often the identified product owner uses the product; and
   send the list of all of the product owners that are skilled users of the product and the probability of expertise in using the product based upon how often the identified product owner uses the product to the requesting user.

9. The system of claim 8, where the asset management service stores information on the products purchased by an organization.

10. The system of claim 8, where, in being programmed to find the product owners that are skilled users of the product from the product ownership data, the processor is programmed to, for each matching product, determine a user that owns the matching product.

11. The system of claim 10, where the processor is further programmed to:
    determine, for each matching product, whether usage data exists in the product ownership data for the matching product, where the usage data comprises information identifying how often the product owner uses the product; and
    calculate, in response to determining that the usage data exists in the product ownership data for the matching product, the probability of expertise in using the product for the user that owns the matching product based on how often the product owner uses the product as represented within the usage data for the matching product.

12. The system of claim 10, where the processor is further programmed to:
    determine, for each matching product, whether location data exists in the product ownership data for the owned products that match the product in the request; and
    calculate, in response to determining that the location data exists in the product ownership data for the matching product, a nearness to the requesting user of the user that owns the matching product based on the location data for the matching product.

13. The system of claim 12, where, in being programmed to create the list of all of the product owners that are skilled users of the product and the probability of expertise in using the product based upon how often the identified product owner uses the product, the processor is programmed to create the list of all of the product owners that are skilled users of the product comprising users that own the matching product and the nearness to the requesting user of the user that owns the matching product.

14. The system of claim 8, further comprising a social networking tool communication interface capable of providing tool set integration with a social networking tool and where:
    in being programmed to receive the request from the user for help with use of the product owned by at least one product user, the processor is programmed to:
       receive the request from the user for help with use of the product owned by at least one product user at the skill finder service computing device via the social networking tool communication interface from the social networking tool.

15. A computer program product comprising a computer useable storage medium having a computer readable program, where the computer readable program when executed on a computer causes the computer to:
    receive, by the computer configured as a skill finder service computing device, a request from a user for help with use of a product owned by at least one product user comprising at least one of a hardware product and a software product;
    search, using an asset management service that separately collects and manages product ownership data comprising ownership data for hardware products and software products, the product ownership data for owned products that match the product in the request, where the product ownership data comprises, for each tracked product, a product identifier, a product owner identity, and a calculated probability of expertise of the identified product owner in using the product based upon how often the identified product owner uses the product, and where the product ownership data is automatically collected by an asset management service for owned products that match the product in the request;
    find product owners that are skilled users of the product from the product ownership data comprising the product identifier for each tracked product and the product owner identity of each tracked product automatically collected by the asset management service;
    create a list of all of the product owners that are skilled users of the product and the probability of expertise in using the product based upon how often the identified product owner uses the product; and
    send the list of all of the product owners that are skilled users of the product and the probability of expertise in using the product based upon how often the identified product owner uses the product to the requesting user.

16. The computer program product of claim 15, where the asset management service stores information on the products purchased by an organization.

17. The computer program product of claim 15, where, in causing the computer to find the product owners that are skilled users of the product from the product ownership data automatically collected by the asset management service, the computer readable program when executed on the computer causes the computer to:
    for each matching product, determine a user that owns the matching product.

18. The computer program product of claim 17, where the computer readable program when executed on the computer further causes the computer to:
    determine, for each matching product, whether usage data exists in the product ownership data for the matching product, where the usage data comprises information identifying how often the product owner uses the product; and
    calculate, in response to determining that the usage data exists in the product ownership data for the matching product, the probability of expertise in using the product for the user that owns the matching product based on how often the product owner uses the product as represented within the usage data for the matching product.

19. The computer program product of claim 18, where, in causing the computer to create the list of all of the product owners that are skilled users, the computer readable program when executed on the computer further causes the computer to:
    create the list of all of the product owners that are skilled users of the product and the probability of expertise in using the product based upon how often the identified product owner uses the product comprising the users that own the matching product and the nearness to the requesting user of the user that owns the matching product.

20. The computer program product of claim 17, where the computer readable program when executed on the computer further causes the computer to:
    determine, for each matching product, whether location data exists in the product ownership data for owned products that match the product in the request; and
    calculate, in response to determining that the location data exists in the product ownership data for the matching product, a nearness to the requesting user of the user that owns the matching product based on the location data for the matching product.

* * * * *